United States Patent
McFarlen

(10) Patent No.: US 7,961,860 B1
(45) Date of Patent: Jun. 14, 2011

(54) SYSTEMS AND METHODS FOR GRAPHICALLY DISPLAYING AND ANALYZING CALL TREATMENT OPERATIONS

(75) Inventor: Christopher R. McFarlen, Coppell, TX (US)

(73) Assignee: Securus Technologies, Inc., Dallas, TX (US)

( * ) Notice: Subject to any disclaimer, the term of this patent is extended or adjusted under 35 U.S.C. 154(b) by 1239 days.

(21) Appl. No.: 11/562,842

(22) Filed: Nov. 22, 2006

(51) Int. Cl.
*H04M 3/00* (2006.01)
*H04M 3/42* (2006.01)

(52) U.S. Cl. .............. 379/188; 379/201.01; 379/201.04

(58) Field of Classification Search .................. 379/188, 379/168, 201.01, 201.04
See application file for complete search history.

(56) References Cited

U.S. PATENT DOCUMENTS

| | | | |
|---|---|---|---|
| 5,319,702 A | 6/1994 | Kitchin et al. | |
| 5,539,812 A | 7/1996 | Kitchin et al. | |
| 5,796,811 A | 8/1998 | McFarlen | |
| 5,805,685 A | 9/1998 | McFarlen | |
| 6,763,099 B1 | 7/2004 | Blink | |
| 7,079,637 B1 | 7/2006 | McNitt et al. | |
| 7,079,639 B2 | 7/2006 | Smith | |
| 7,136,471 B2 | 11/2006 | Johnson | |
| 2007/0071206 A1 * | 3/2007 | Gainsboro et al. ............ | 379/168 |

OTHER PUBLICATIONS

U.S. Appl. No. 10/135,878, filed Apr. 29, 2002, Viola et al.
U.S. Appl. No. 10/642,532, filed Aug. 15, 2003, Robert L. Rae.

* cited by examiner

*Primary Examiner* — Thjuan K Addy
(74) *Attorney, Agent, or Firm* — Fogarty, L.L.C.

(57) ABSTRACT

A system and method for graphically demonstrating a call-processing operation include receiving data representing signals in a telephone call and data from an event-detecting algorithm, the data from the event-detecting algorithm describing an operation of the algorithm on the telephone call, and generating a graphical display including a waveform based on the data representing signals in the telephone call and a graph of the operation of the event-detection algorithm.

31 Claims, 4 Drawing Sheets

SYSTEMS AND METHODS FOR GRAPHICALLY DISPLAYING AND ANALYZING CALL TREATMENT OPERATIONS

TECHNICAL FIELD

The present invention relates generally to systems for controlling phone access in a variety of institutions.

BACKGROUND OF THE INVENTION

In some call processing systems, it may be desirable to detect the occurrence of events, such as three-way calling events, as may be invoked by a remote calling party and/or may be attempted to be hidden from a call processing system. For example, in prison call processing systems, prisoners are often forbidden from calling some parties, i.e., judges, victims, witnesses, and the like. Accordingly, some prisons have adopted call processing systems that use a list of allowed and/or disallowed telephone numbers for individual prisoners and/or all prisoners collectively. When an inmate attempts to call a forbidden number or a number which is not an allowed number, the prison call processing system does not set up a call. To avoid the call processing system blocking such calls, some inmates have attempted to call an outside party and then use the outside party to establish a three-way call with the forbidden phone number. In that case, since an outside line is already established, the challenge becomes enabling the call processing system to recognize three-way calls from outside lines and disconnect the call in response thereto.

An example prison call processing system monitors signals on a telephone line for a burst of sub-300 hertz energy that is typically associated with a hook flash (i.e., depressing the hook switch on a telephone). Hook flashes are the usual method whereby users signal to the telephone company's central office to set up a three way call. Upon detecting a hook flash, the prison call processing system disconnects the call to prevent unauthorized contact with forbidden parties.

Noisy dual-tone multi frequency (DTMF) touch-tone keypads, especially dirty keypads, can produce a click when making connection during actuation, thereby creating a sound with sub-300 hertz energy. This can create a problem when an inmate makes a collect call to a party. According to conventional methods, upon receiving the collect request, the called party enters a number by depressing a DTMF key to accept the call. However, the prison call processing system may mistake this accept signal for a three-way event and disconnect the call before the conversation begins. It is a challenge for call processing system designers to program the systems to distinguish between hook flashes and other sounds, such as dirty keypads. In addition to dirty keypads, other phenomena result in low accuracy for event-detection algorithms. For example, noises caused by the telephone system itself switching the caller from a recorded message to a connected conversation may fool the system into detecting a false event.

Currently, it is difficult for a technician or administrator to debug or set-up a system because the data that is analyzed by the system is often not saved. Further, current systems are embodied in hardware, often in specialized boards that do not offer ways to view the operation in real time. In fact, users are usually limited, at most, to inspecting the debug registers of the board's processor. Thus, debugging or setting up a system is often time consuming and frustrating because of a lack of available and convenient information for the technician. Further, owners of the system (and potential customers) may not be able to satisfy themselves of proper operation because of the same lack of information.

BRIEF SUMMARY OF THE INVENTION

Various embodiments of the present invention provide for systems and methods for presenting graphical displays of the operation of an event-detection algorithm both in real-time and during playback. In an example embodiment, a graphical display system is in communication with a unit that performs an algorithm for analyzing telephone calls and identifying events in those telephone calls. The graphical display system receives data from the unit, wherein the data includes data representing signals in the telephone line, data representing a mode of the telephone call, data representing settings for determining an event, and data representing identification of events. The graphical display system receives this data and uses it to render a visual depiction of the operation of the algorithm. For instance, the visual depiction includes a waveform representation of the signal on the telephone line. Further, indications of the mode of the telephone call and any flags are included and are changed, as appropriate, with time.

The display may include an interface for viewing and modifying algorithm parameters. For example, graphical representations of the settings for determining an event may be visually depicted so that a user may readily see how those settings correspond to the telephone call signal as represented by the aforementioned waveform. Accordingly, a technician may change the operation of the algorithm to optimize performance by changing the parameters within the display and readily visualize their effect on the operation if the algorithm with respect to the telephone call signal.

The graphical display system may also include a data storing capability. In this way, the system logs the data that it receives. Stored data may be accessed later and viewed in the same type of display as with live data. Various features allow some embodiments to be useful during debugging and set-up of a telephone system, as a technician or administrator has access to real-time information regarding operation and can effectively "see" the telephone call and analysis thereof.

Some embodiments of the invention further include a system and method for demonstrating the operation of a telephone call event detector. For example, a user may operate the system to detect events while at the same time operating the graphical display device. Effectiveness and accuracy of the system are thereby demonstrated in a visual manner to customers and/or potential customers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
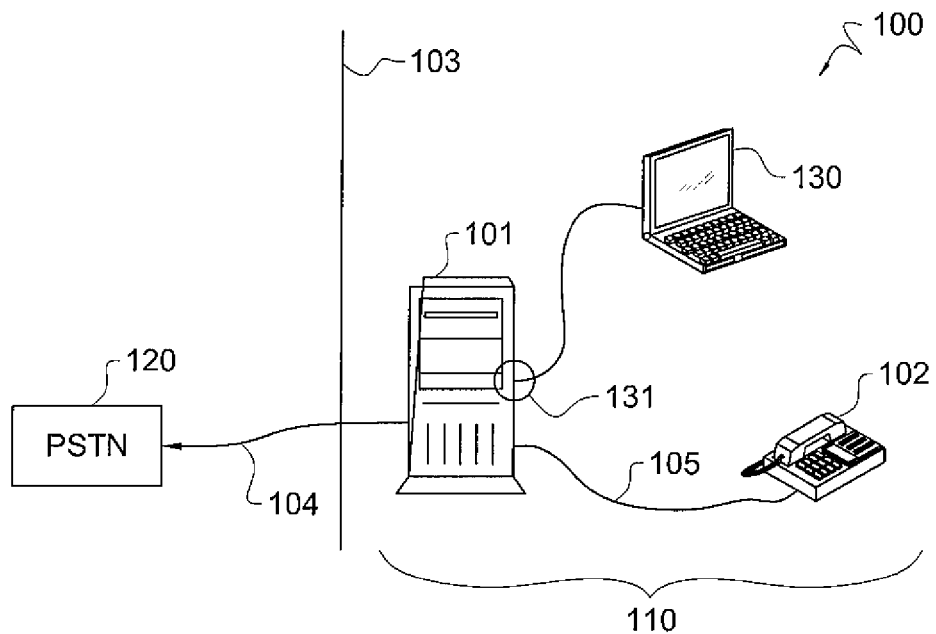
FIG. 1 is an illustration of an exemplary system that includes a graphical display system adapted according to one embodiment of the invention.

FIG. 1 is an illustration of system 100 that includes graphical display system 130 adapted according to one embodiment of the invention. Graphical display system 130 is depicted as a computer in FIG. 1, but is more accurately described (in some embodiments) as a program that may be run on a computer and receives data from an analyzing algorithm in unit 101 and displays a representation of the signals on telephone line 104/105 and a representation of the results of the analyzing algorithm. A more detailed description of the interface of graphical display system 130 is included in the description of FIG. 2, below. Output 131 allows graphical display system 130 to connect to unit 101 and receive data from the call event detection algorithm operable thereon.

System 100 includes telephone system 110 that is connected to Public Switched Telephone Network (PSTN) 120 through line 104. Boundary 103 separates telephone system 110 from PSTN 120 and may be considered to conceptually represent a separation between equipment owned by the telephone company and equipment owned by a customer. Boundary 103 may also represent a separation between an institution owning system 110 and the outside world. Unit 101 and telephone 102 do not have to be at the same physical location. For example, phone 102 may be at an institution, while 101 may be at the offices of a call processing contractor. In another example, system 110 is part of a larger Private Branch Exchange (PBX) that employs unit 101 to add various functionality, as described further below. These and other arrangements for system 100 are within the scope of various embodiments.

Telephone system 110 is a call processing system that may perform various functions, including controlling telephone access by a user of telephone 102. A few of the various functions that may be performed by system 110 are described in U.S. patent application Ser. No. 10/135,878, filed Apr. 29, 2002, entitled "INFORMATION MANAGEMENT AND MOVEMENT SYSTEM AND METHOD," U.S. patent application Ser. No. 10/602,233, filed Jun. 24, 2003, entitled "SYSTEMS AND METHOD FOR TRANSACTIONS AND INFORMATION MANAGEMENT," and U.S. patent application Ser. No. 10/642,532, filed Aug. 15, 2003, entitled "CENTRALIZED CALL PROCESSING," the disclosures of which are hereby incorporated herein by reference. In one example, system 110 assigns and administers user accounts, allowing users or others to deposit money into accounts, debiting money from accounts when telephone calls are made, and monitoring the users' calls.

As described before, system 110 maintains a list of allowed and/or forbidden telephone numbers and also includes functionality to prevent a user from participating in a three-way call. Unit 101 includes an analyzing algorithm to detect events, such as three-way calls, and in one example, unit 101 contains a Digital Signal Processor (DSP) chip performing the algorithm by sampling, digitizing, analyzing signals on telephone line 104/105, and identifying phenomena that are indicative of the various events. A number of algorithms for detecting events, including three-way call events, are described in U.S. Pat. Nos. 5,319,702, 5,539,812, 5,796,811, 5,805,685, 6,763,099, 7,079,636, 7,079,637, and 7,136,471 the disclosures of which are hereby incorporated herein by reference.

In this example, graphical display system 130 provides a real time or near real-time graphical representation of the operation of the analyzing algorithm for a given channel so that a technician can visually inspect the performance of the algorithm. "Real time" is used herein to describe the quality of appearing to a human user to be performed at the same time as the data is received, any imperceptible system delay notwithstanding. A technician can see one or more waveforms that represent the signals on line 104/105, including speech, clicks, hook flashes, DTMF keystrokes, dial tones, and the like. It should be noted that the algorithm may limit its analyzing to the signals on one of lines 104 and 105, e.g., line 104. Graphical display system 130 also includes data derived by the algorithm, such as flags set to indicate detection of an event, and parameters, such as thresholds used by the algorithm in its analysis to detect clicks, silence, and the like. In short, a technician can see how the analyzing algorithm is functioning as the call is carried on and as various events happen.

It should also be noted that the information is recordable, so that a computer that is running graphical display system 130 can save the information to a computer-readable medium. Later, a technician can use graphical display system 130 to access the saved information and "play" it back to view phone calls and system reactions that have transpired. Additionally, unit 101 or another functional unit (not shown) may record the calls and operation of the algorithm and provide those recordings to graphical display system 130.

In another aspect, graphical display system 130 is a user interface to the analyzing algorithm, thereby acting as a debugging tool for a programmer or technician. As the programmer views the reaction of the algorithm to events in a telephone call, the programmer can change various parameters to adjust the operation of the algorithm. For instance, if the programmer notices that the algorithm is missing hook flashes, graphical display system 130 provides an interface for the examiner to change the values of the parameters that affect the response of the algorithm, thereby improving the performance. In one example, a programmer can view the various volumes of signals, such as dial tones, and increase or decrease the parameter thresholds accordingly to achieve more accurate operation of the algorithm. As described in the referenced patents and applications above, various parameters for the algorithm include, for example, click amplitude, length of pulse, length of silence, silence level, and the like.

In yet another aspect, graphical display system 130 may be a somewhat self-contained system by including the analyzing algorithm in the same device, e.g. a laptop computer. In such a system, a technician can input recorded calls, optimize the algorithm parameters, and download the parameters into an actual deployed call-processing system.

Figure 2:
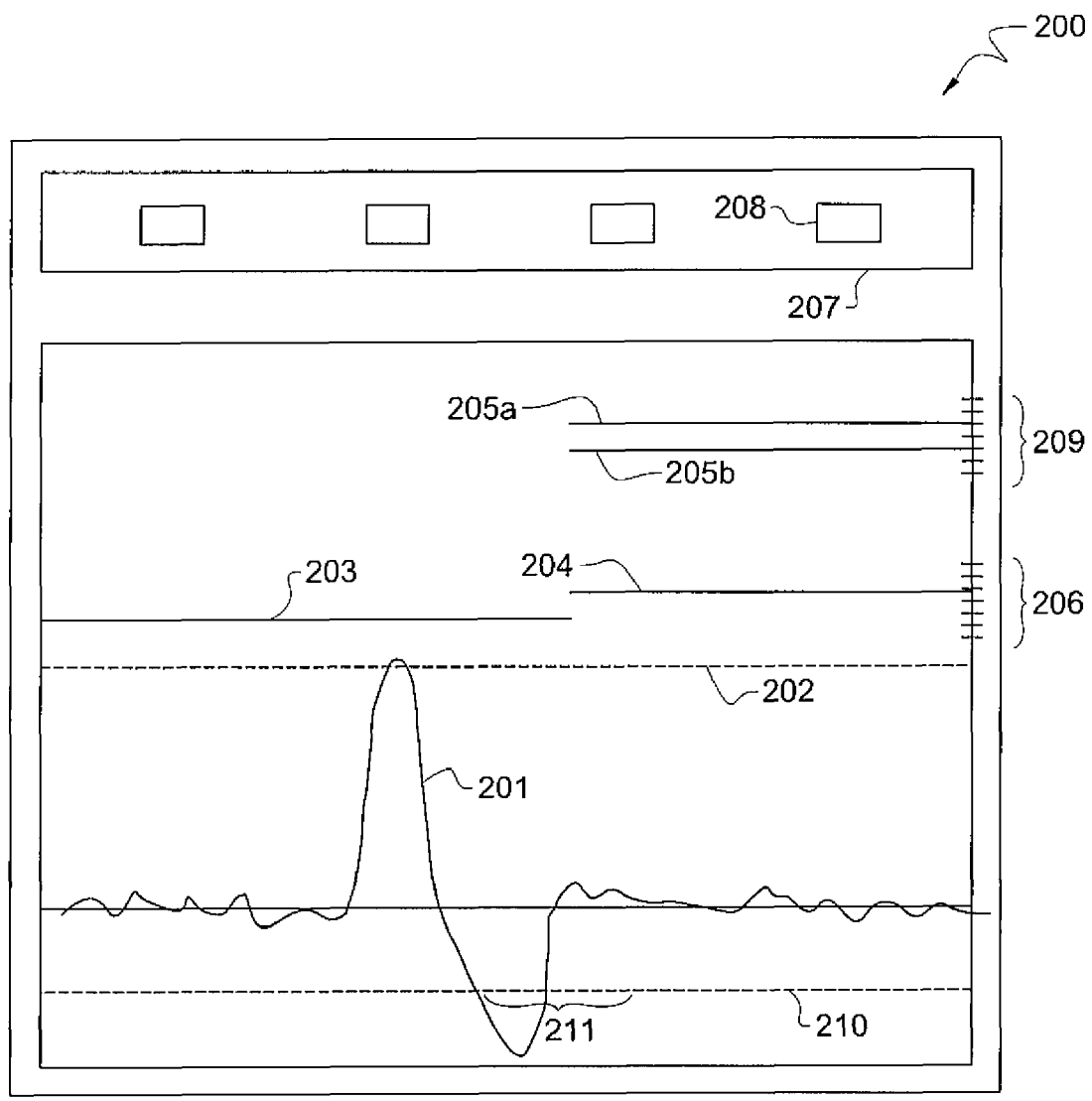
FIG. 2 is an illustration of an exemplary display screen of an example graphical display system according to at least one embodiment of the invention.

FIG. 2 is an illustration of example display screen 200 of an example graphical display system according to at least one embodiment of the invention. Screen 200 features waveform 201 that is based on the signal in the telephone line. In this example, waveform 201 is continuously scrolling during operation, unless paused or stopped, in order to give a real-time view of the telephone call.

Threshold levels 202 and 210 are levels used by the DSP algorithm for detecting events, such as three-way events. Threshold levels 202 and 210 are provided on screen 200 so that an administrator can view the amplitude of waveform 201 in relation to the set thresholds. Typically, when a threshold is crossed, the algorithm reacts in some way, for example, by indicating an event or awaiting another incident, such as the threshold being exceeded for a period of time, another threshold being crossed, etc. In one example, threshold 202 is an amplitude for a particular frequency, such that it represents at least two parameters—a frequency and an amplitude. Threshold 210 is a silence threshold that indicates when there is negligible noise in the signal.

Threshold levels 202 and 210 are for example only, and algorithms may use a variety of thresholds in order to detect various events using diverse methods. In fact, in some embodiments, screen 200 graphically displays thresholds, limits, parameters, and the like, such as, for example, by including silence/amplitude durations, etc. An example of a silence duration indicator is silence window 211. In one example, silence window 211 appears on the screen when silence threshold 210 is crossed. In FIG. 2, it can be seen that the requisite silence level was reached but was not present for the requisite amount of time—thus, at least one event was not detected. However, as explained further below, flags 205a and 205b indicate that other events were detected.

Lines 203 and 204 indicate a mode of the telephone call being monitored. Modes are simply predefined stages or progressions of a telephone call. For example, an on-hook phone may be at mode zero, while a calling party causing a phone to go off-hook may be mode 1. Modes may also be defined at various stages, in no particular order, such as dialing, called party going off-hook, collect call requested, collect call accepted, called party going on-hook, and the like. In this example, lines 203 and 204 scroll across screen 200 along with waveform 201 so that an administrator can see the progression of the call alongside the telephone signals and observe the timing of each. Markings 206 serve as a legend to indicate the modes represented by lines 203 and 204. In this case, the end of line 203 and the beginning of line 204 indicate that there has been a mode change associated with the large peak and trough in waveform 201.

Lines 205a and 205b represent flags indicating, among other things, conditions and events in the telephone call. In other words, the flags indicate, among other things, results of the analyzing algorithm. Flags may be used to indicate, for example, a potential three-way event, a decision that a three-way event has occurred, that the call is or is not recorded, that the calling party is muted, etc. Markings 209 inform the administrator of the meanings of lines 205a and 205b by acting as a legend for the different flags. It can be seen that two flags (indicated by 205a and 205b) have been set in response to the spike in waveform 201.

In this example, lines 203-205a and 205b scroll with waveform 201 as time progresses in order to provide a time-dependent view of the telephone call and the state of the algorithm. Lines 203-205a and 205b are but one way to represent call modes and flags, and other ways exist and are within the scope of various embodiments. For example, flags and/or call states can be indicated alphanumerically in one or more boxes on screen 200.

Screen 200 also includes parameters interface 207 that is used to view and edit parameters in the algorithm. In this example, fields 208 display parameters and also offer a technician the opportunity to change the parameters if he or she desires. Depending on the capabilities of the graphical display system and the algorithm, some embodiments allow real-time adjustment of parameters, while other embodiments do not. Interface 207 is displayed on screen 200 with waveform 201; however, other embodiments may provide access to interface 207 through use of a pull-down menu from a toolbar, a dialog box, or the like.

Figure 3:
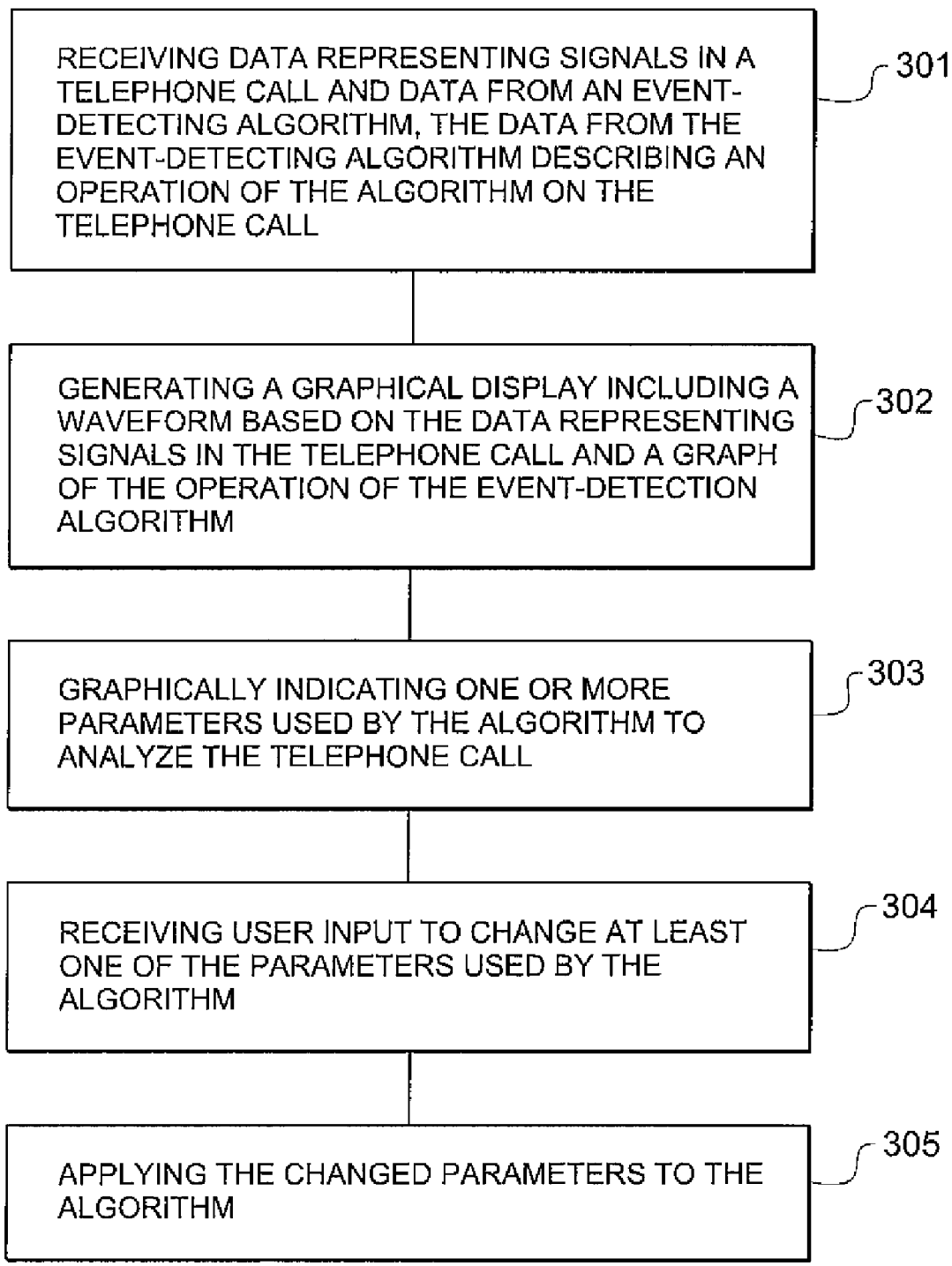
FIG. 3 is a flow diagram of an exemplary method that may be performed by a graphical display system, such as the graphical display system of FIG. 1.

FIG. 3 is a flow diagram of method 300 that may be performed by a graphical display system, such as system 130 of FIG. 1. In step 301, the graphical display system receives data representing signals in a telephone call and data from an event-detecting algorithm, the data from the event-detecting algorithm describing an operation of the algorithm on the telephone call. The event detecting algorithm may include functionality from one of the analyzing algorithms described above with regard to FIG. 1. The data from the event detecting algorithm may include one or more of data representing parameters used by the algorithm to analyze the signals, data representing a mode of the telephone call, and data representing identification of a plurality of events (e.g., three-way events) in the telephone call, and the like. As explained above, in some embodiments, the graphical display system is in communication with an analyzing and identifying unit that outputs the data. In such a case, it is the analyzing and identifying unit (e.g., a DSP unit) that contains the event-detecting algorithm that monitors the call, while the graphical display system acts as a user interface for the analyzing and identifying unit. In another example, the graphical display system is included in the same device as the event-detecting algorithm.

In step 302, the graphical display system generates a graphical display including a waveform based on the data representing signals in the telephone call and a graph of the operation of the event-detection algorithm. In other words, the graphical display system renders a waveform far the telephone call along with a graph showing how the algorithm is operating. In some embodiments, a technician may use the graphical display system to intuitively verify operation of the event-detection algorithm. The graphical display may be similar to screen 200 of FIG. 2. The graphical display system provides real-time tracking of the call, including its modes and events, in the graphs on the screen. For example, the waveform may be similar to waveform 201, while the call mode is represented by lines, such as lines 203 and 204, and the events may be represented by flags, indicated as lines, such as lines 205a and 205b, all of FIG. 3.

In step 303, the graphical display system graphically indicates one or more parameters used by the algorithm to analyze the telephone call. In one example, the screen contains a parameter interface, such as interface 207 of FIG. 2, whereby a user may see the parameters displayed. Step 303 may be performed at the same time as step 302, such that modes, events, and parameters are displayed in the same step.

In steps 304 and 305, the graphical display system receives user input to change parameters in the algorithm and applies the changed parameters to the algorithm. In one embodiment, the graphical display system allows a technician to modify the parameters as he sees fit using interface 207 of FIG. 2 to optimize the performance of the algorithm in its particular telephone system.

An advantage of using a graphical display system is that it provides a Graphical User Interface (GUI) for the analyzing algorithm. In some embodiments, it may replace the practice of manually checking the registers in a DSP debug unit. It is usually a more pleasing experience for an administrator to work with the graphical display system rather than in an environment that requires technical knowledge of DSP components in order to view algorithm operation and set/change parameters.

Moreover, the graphical display system provides a programmer or administrator with a convenient tool with which to study performance under different conditions and parameters with both live and recorded data. For example, a three-way detection algorithm may include default or "typical" settings that are in a range of frequently-used parameters. However, when an analyzing unit is deployed in a new environment, the actual phone lines, the service provider, the destination called, and the like, may create a scenario wherein the parameters require adjustment from the default settings. In such a case, the technician may use the graphical display system to see how the algorithm reacts and to change the parameters to optimize performance under the actual conditions.

Figure 4:
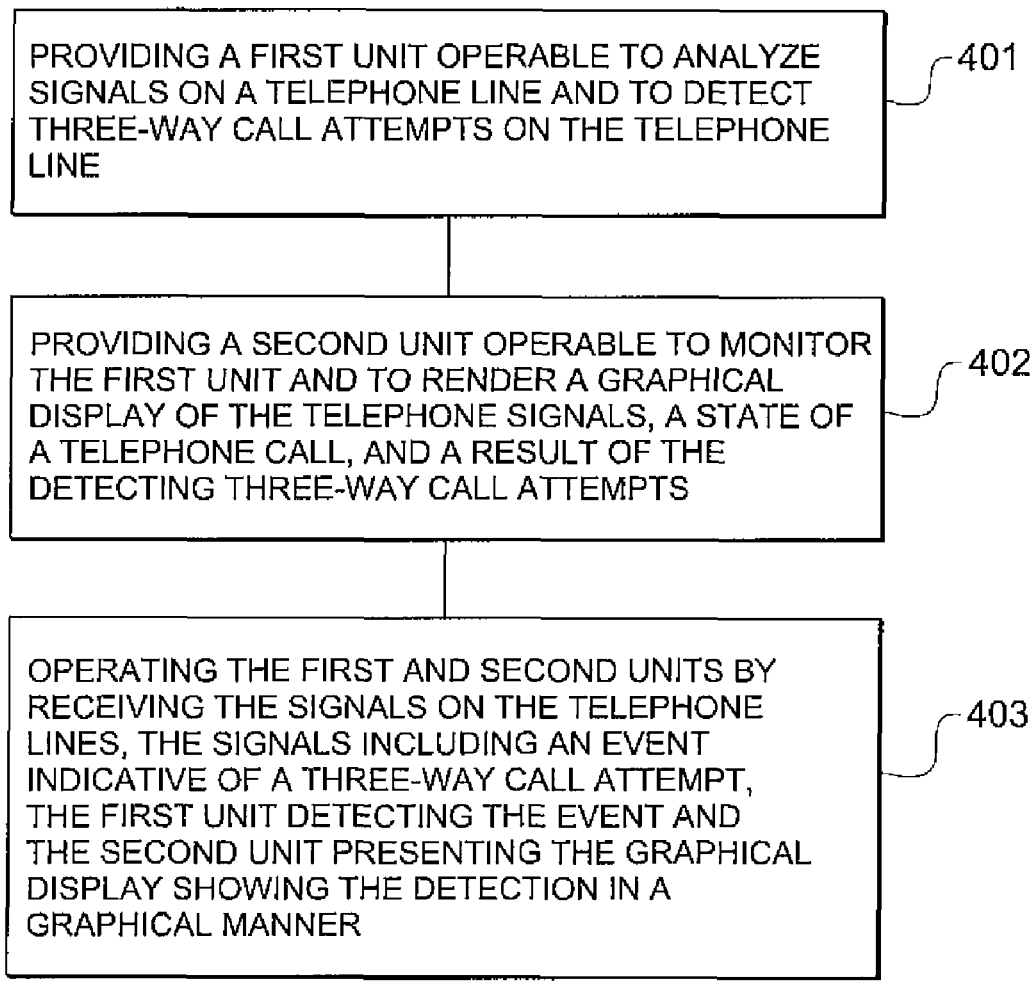
FIG. 4 illustrates a flow for an exemplary method that may be performed, for instance, during a sales call.

Graphical display systems may find a place not only in system set-up and debugging exercises, but may also be adapted for use in sales or to otherwise prove the effectiveness of the operation of the algorithm. For instance, a salesman of a telephone call access control system may use a graphical display system to demonstrate the effectiveness of the call event detection algorithm. FIG. 4 illustrates a flow for example method 400 that may be performed, for instance, during a sales call.

In step 401, the seller provides a first unit operable to analyze signals on a telephone line and to detect three-way call attempts on the telephone line. The first unit may be similar to unit 101 (FIG. 1) by performing an algorithm to detect various events in a telephone call, as described before. In some embodiments, the first unit is a general purpose computer system, a specialized computer, a board containing a DSP and supporting components that executes a program operable to perform the recited function, or may simply be an executing program. In fact, the first unit may be based on hardware, software, or a combination of the two. The first unit is not limited to any particular form as long as it is able to analyze signals on a telephone line and to detect various events thereon.

In step 402, the seller provides a second unit operable to monitor the first unit and to render a graphical display of the telephone signals, a state of a telephone call, and a result of the detecting three-way call attempts. The second unit may be a graphical display system as in FIG. 1 with a screen similar to that shown in FIG. 2. The second unit in one example is a general purpose computer performing an algorithm to receive input from the first unit and display it in a convenient, graphical form. In other embodiments, the second unit may be a computer program running on a computer that also hosts the first unit. In fact, the second unit may be based on hardware, software, or a combination of the two.

In step 403, the seller operates the first and second units by receiving the signals on the telephone lines, the signals including an event indicative of a three-way call attempt, the first unit detecting the event and the second unit presenting the graphical display showing the detection in a graphical manner. In this way, the seller demonstrates that the system operates effectively. It should be noted that the telephone lines may be connected to a PSTN or into a PBX, such that the monitored telephone call is an actual, live call. Alternatively, the telephone line may be connected to a unit for providing recorded and/or sample inputs, such as recordings of calls or fabricated signals simulating telephone calls.

The versatility of a graphical display system, as described above, is attributable, at least in part, to its adaptability for use with a variety of other features in some embodiments. Returning to FIG. 1, unit 101 performs the analyzing and event-detecting algorithm and is provided with functionality that allows it to set its own parameters based on known test signals. For instance, it can calculate correct parameters using a built-in iterative feedback system that adjusts the parameters until results are obtained that correspond to the known test signal events. In one example, an installation technician uses telephone 102 to call a device that plays the known test signal. At the same time, the technician monitors the effectiveness of the installation in real-time using graphical display device 130. While this example describes an automated set-up process, graphical display device 130 may also be used in a manual set-up scenario by providing the technician with real-time feedback and an interface to modify parameters as he monitors the call and the flags.

In another example, the analyzing and detecting unit has functionality to allow it to distinguish a dirty keypad from a hook flash. The functionality includes a DTMF detect algorithm that dismisses a click if 1) the click is not associated with a telephone call mode change and 2) if a DTMF signal is detected. If the two conditions are met, the algorithm interprets the click as other than a hook flash. Graphical display system 130 may be used to verify proper operation of this procedure by allowing a technician or administrator to verify the click, the DTMF signal, and the mode of the call.

The modes discussed earlier are useful, both in unit 101 and in graphical display system 130. Either or both of graphical display system and the analyzing algorithm may determine the mode of a call, usually by comparing recognizable occurrences in the call signal (e.g., dial tone, DTMF signal, and the like) to mode criteria. A number of example modes include:

Mode 0—no call
Mode 1—inmate picks up phone 102 (goes "off-hook")
Mode 3—immediately follows dialing
Mode 6—immediately follows calling party's acceptance of collect call
Mode 8—call is connected Other modes may exist, but are not described herein for convenience. Defining modes allows the algorithm to take specified action based on the state of the call. The phone system can enable and disable features based upon the mode. For instance, in some modes, such as Mode 3, it may be desirable to ignore apparent three-way attempts, as they are false positives. However, other call modes, such as Mode 8, may merit vigilance against three-way attempts. Further, there are modes wherein it is desirable to allow the inmate to hear the called party. On the other hand, there are modes when it is undesirable to allow the inmate to hear the called party or talk to the called party. This feature can add an extra level of control over the inmate's communication by changing call configurations with mode changes.

Mode-based action, however, adds some amount of complexity to the algorithm since some actions will only occur in some modes. Therefore, graphical display system 130 may be useful in some embodiments to allow an administrator to track the modes, along with the flags and the signal on lines 104/105, as the algorithm operates to assure both proper mode detection and event detection.

The data log function of graphical display system 130 provides an opportunity to more accurately log three-way events than do current systems. For instance, at least one event detection method interprets all hook flashes as three-way events, which results in hang-ups being counted as events for concern rather than as a normal termination of a telephone call. With regard to the operation of phone system 110 (FIG. 1), such inaccuracy is irrelevant to performance since a hang-up and a three-way attempt result in the same thing—a disconnected call. When no data store is used, such operation is tolerable because the inaccuracy is not visible (i.e., not recorded). However, when using a data store, it becomes apparent to an administrator that the number of three-way attempts recorded is far too high because the number includes all hang-ups. This may erode an administrator's trust in the proper operation of system 101.

Accordingly, it is desirable to provide functionality to the algorithm that allows it to distinguish hang-ups from three-way attempts. The method includes detecting a click that may or may not signal a three-way event. The algorithm then waits 30 seconds, during which time the PSTN has an opportunity to provide hang up supervision. Hang-up supervision may include a dial tone, a loop drop, or a sit tone. If the PSTN provides hang-up supervision, the algorithm simply terminates the call and does not count a three-way event. Alternatively, if after thirty seconds there is no disconnect supervision indication from the PSTN and speech is detected, then the algorithm interprets the click as a call setup for a three-way conversation. The algorithm then terminates the call, and graphical display system 130 and/or the algorithm logs a three-way event. In the case of a digital telephone line, action may depend on the particular protocol used to provide specific event sequences that indicate a hang-up or a three-way event.

While the examples described above focus on systems for use in a controlled environment facility (e.g., a prison) telephone system to identify outside three-way call attempts, the invention is not so limited. For example, various embodiments may be included in educational, commercial, and household systems. While the examples above discuss three-way event detection, it should be noted that an analyzing algorithm in some embodiments may detect other kinds of events, such as, e.g., call waiting events and hang-ups. Various embodiments are not limited to any specific kind of event detection.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 5:
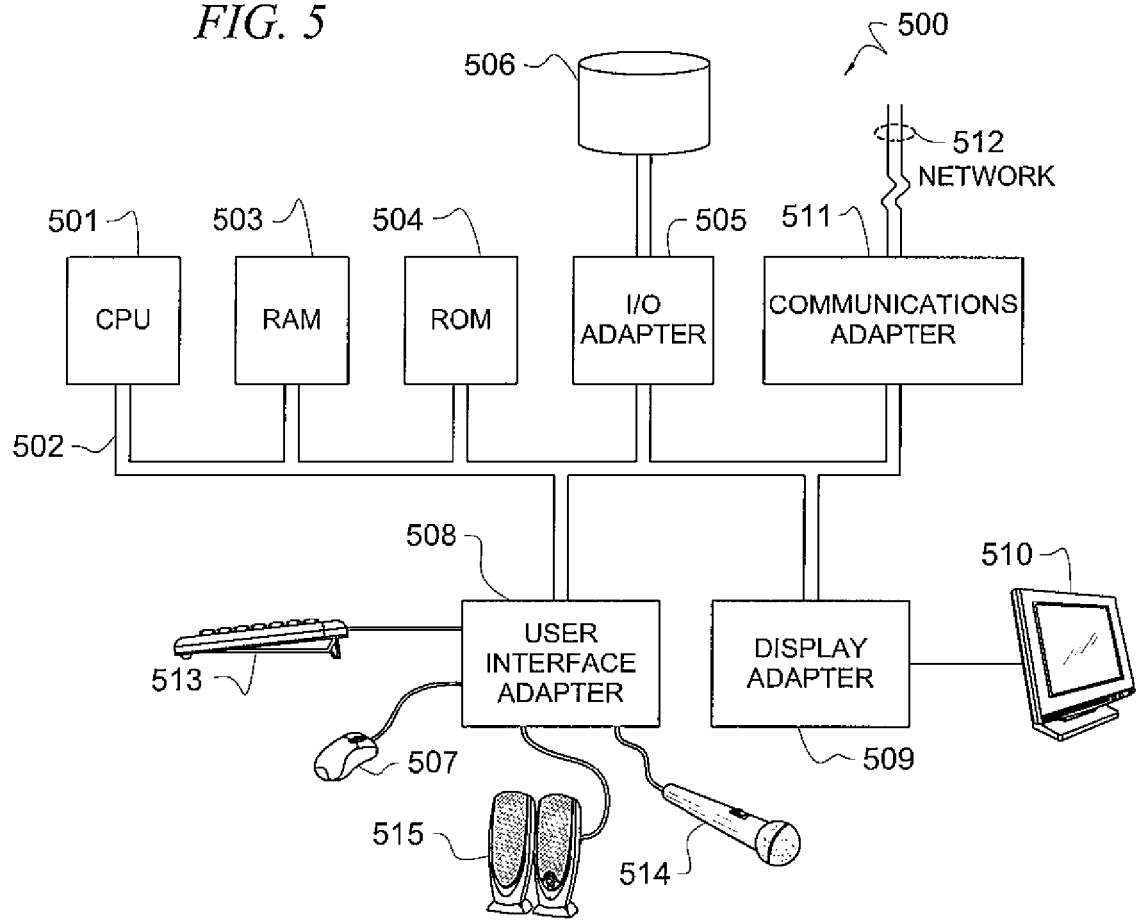
FIG. 5 illustrates an exemplary computer system adapted according to embodiments of the present invention.

FIG. 5 illustrates an example computer system 500 adapted according to embodiments of the present invention. That is, computer system 500 comprises an example system on which embodiments of the present invention may be implemented (such as a computer that performs an event detection algorithm or executes a program for a graphical display system). Central processing unit (CPU) 501 is coupled to system bus 502. CPU 501 may be any general purpose CPU, and the present invention is not restricted by the architecture of CPU 501 as long as CPU 501 supports the inventive operations as described herein. CPU 501 may execute the various logical instructions according to embodiments of the present invention. For example, CPU 501 may execute machine-level instructions according to the exemplary operational flows described above in conjunction with FIG. 3.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as parameters for an event detection algorithm.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing past call data. Communications adapter 511 is preferably adapted to couple computer system 500 to network 512. User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the user interface (such as that of FIG. 2) of embodiments of the present invention.

It shall be appreciated that the present invention is not limited to the architecture of system 500. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for graphically demonstrating a call-processing operation, said method comprising:

receiving data representing signals in a telephone call and data from an event-detecting algorithm, said data from said event-detecting algorithm describing an operation of said algorithm on said telephone call;

generating a graphical display including a waveform based on said data representing signals in said telephone call and a graph of said operation of said event-detection algorithm, said graphical display further including one or more parameters used by said algorithm to analyze said telephone call depicted in relation to said waveform.

2. The method of claim 1 wherein said receiving and said generating are performed by a single device.

3. The method of claim 1 wherein one or both of said data representing signals in a telephone call and said data from said event-detecting algorithm are recorded data.

4. The method of claim 1 wherein said generating said graphical display includes:
graphically indicating one or more modes of said telephone call.

5. The method of claim 1 wherein said data from said event-detecting algorithm identifies an occurrence of one or more events in said telephone call, and wherein said generating said graphical display includes:
graphically indicating said plurality of events in said telephone call.

6. The method of claim 5 wherein said plurality of events in said call include one or more of:
a hang-up event; and
a three-way event.

7. The method of claim 1 wherein said generating said graphical display includes:
presenting a user interface to manipulate said one or more parameters used by said algorithm to analyze said telephone call.

8. The method of claim 7 further comprising:
receiving user input from the user interface to change at least one of said parameters used by said algorithm; and
applying said changed parameters to said algorithm.

9. The method of claim 7 wherein said one or more parameters includes at least one of:
an amplitude threshold for a particular frequency:
silence threshold; and
silence duration.

10. The method of claim 1 wherein generating said graphical display includes:
scrolling said waveform and said graph of said operation of said event-detection algorithm across a screen at a rate approximating real-time operation of said algorithm.

11. A system for processing telephone calls, said system comprising:
a processing unit connected to a telephone line, said unit operable to perform an analyzing algorithm on signals on said telephone line and to output data based on a result of said analyzing algorithm; and
a graphical display system connected to said processing unit for receiving said data, said graphical display system operable to display a representation of said signals on said telephone line and a representation of said result of said analyzing algorithm, said graphical display further including one or more parameters used by said algorithm to analyze said telephone call depicted in relation to said representation of said signals.

12. The system of claim 11 wherein said telephone line is connected to a device operable to output known test signals and said processing unit is further operable to receive said known test signals and to adjust said one or more parameters to optimize accuracy of identifying said one or more events.

13. The system of claim 11 wherein said one or more parameters include one or more of:
an amplitude threshold for a particular frequency:
silence threshold; and
silence duration.

14. The system of claim 11 wherein said graphical display system is operable to accept user input setting said one or more parameters in said processing unit.

15. The system of claim 11 wherein said one or more events include at least one of:
a three-way event; and
a hang-up event.

16. The system of claim 11 wherein said processing unit is included in a private branch exchange of an institution.

17. The system of claim 11 wherein said unit samples and digitizes said signals before performing said analyzing algorithm.

18. The system of claim 11 wherein said analyzing unit is further operable to compare occurrences in said signal with a plurality of predefined telephone call modes and to identify said mode of a telephone call based thereon.

19. The system of claim 11 wherein said representation of said signals on said telephone line is a waveform scrolling across a screen, and wherein said representation of said result of said analyzing algorithm includes graphical indications of one or more events in a telephone call and one or more modes of said telephone call.

20. A method for demonstrating three-way call detection, said method comprising:
providing a first unit operable to analyze signals on a telephone line and to detect three-way call attempts on said telephone line;
providing a second unit operable to monitor said first unit and to render a graphical display of said telephone signals and one or more parameters used by said first unit to analyze said signals, said one or more parameters depicted in relation to said graphical display of said telephone signals;
operating said first and second units by receiving said signals on said telephone line, said signals including an event indicative of a three-way call attempt, said first unit detecting said event and said second unit presenting said graphical display showing said detection in a graphical manner.

21. The method of claim 20 wherein said operating said first and second units comprises:
checking said signals for a human voice for a predetermined time period after identifying a hook flash; and
after detecting signals representing a human voice, setting a flag in said graphical display that informs a user of said three-way call attempt.

22. The method of claim 21 further comprising logging said three-way call attempt.

23. The method of claim 19 further comprising:
receiving user input through said second unit, said user input specifying said one or more parameters for detecting three-way call attempts; and
applying said one or more parameters to said first unit.

24. The method of claim 20 wherein said first unit is operable to detect a mode of said telephone call, and wherein said second unit is operable to render a graphical display of said mode.

25. A system for monitoring and controlling telephone use, said system comprising:
first means for analyzing signals in a telephone call and identifying events and modes of said telephone call through use of an algorithm;

second means for receiving data from said first means, creating a graphical display that demonstrates operation of said algorithm, and rendering a view of said signals versus time.

26. The system of claim 24, wherein said second means further comprise:

means for receiving user input specifying parameters for said algorithm and applying said parameters to said algorithm; and means for displaying said one or more parameters in relation to said view of said signals.

27. The system of claim 24 wherein said first means includes means for identifying three-way call attempts.

28. The system of claim 24 further comprising:

means for identifying at least one event in said telephone call as a hook flash;

means responding to said hook flash as a three-way call attempt by disconnecting said telephone call.

29. The system of claim 27 wherein said means for responding to said hook flash as a three-way call attempt further comprises:

means for checking for signals representing a human voice for a predetermined time period after identifying said at least one event in said telephone call as a hook flash; and means for, after detecting signals representing a human voice, setting a flag that informs a user of said three-way call attempt.

30. The system of claim 27 wherein said means for responding to said hook flash as a three-way call attempt further comprises:

means for checking for a Dual Tone Multi Frequency (DTMF) signal in said telephone call; and means for determining that said DTMF signal is not present in said telephone call, wherein said responding is in response to said determining.

31. The system of claim 29 further comprising means for logging said hook flash as a three-way call attempt.

* * * * *